United States Patent [19]

Perrill et al.

[11] Patent Number: 5,003,472
[45] Date of Patent: Mar. 26, 1991

[54] APPARATUS FOR ORDER ENTRY IN A RESTAURANT

[75] Inventors: John C. Perrill; John P. Perrill; James W. Perrill, all of Chaska; Thomas C. Court, St. Louis Park, all of Minn.

[73] Assignee: Wand Corporation, Chanhassen, Minn.

[21] Appl. No.: 449,369

[22] Filed: Dec. 6, 1989

Related U.S. Application Data

[63] Continuation of Ser. No. 279,793, Dec. 5, 1988, abandoned.

[51] Int. Cl.$^5$ .................. G06F 15/22; G06F 15/20
[52] U.S. Cl. ................................ 364/401; 235/375
[58] Field of Search ............... 364/200, 400, 401–408; 235/375–381, 382–386, 435, 462–467, 472, 495

[56] References Cited

U.S. PATENT DOCUMENTS

| | | | |
|---|---|---|---|
| 4,396,985 | 8/1983 | Ohara | 364/900 |
| 4,530,067 | 7/1985 | Dorr | 364/900 |
| 4,553,222 | 11/1985 | Kurland et al. | 364/900 |
| 4,569,421 | 2/1986 | Sandstedt | 235/383 |
| 4,638,312 | 1/1987 | Quinn et al. | 235/383 |

FOREIGN PATENT DOCUMENTS

| | | |
|---|---|---|
| 0067937 | 6/1977 | Japan . |
| 10001982 | 10/1982 | Japan . |
| 0137076 | 8/1983 | Japan . |
| 2168515 | 6/1986 | United Kingdom . |
| 2196766 | 5/1988 | United Kingdom . |

Primary Examiner—Gary V. Harkcom
Assistant Examiner—John Merecki
Attorney, Agent, or Firm—Merchant, Gould Smith, Edell, Welter and Schmidt

[57] ABSTRACT

Apparatus for order entry in a restaurant includes a host and remote portable terminals. Orders are entered on the remote terminals and sent by radio frequency communication to the host systems. The portable terminals include a bar code template of menu items and a light pen for scanning menu item selections. Orders are entered by scanning selections in a manner similar to the use of a conventional restaurant order pad. Terminals and printers are connected to the host system and are used to display orders entered at portable terminals for the cooks in the kitchen and to print order receipts.

13 Claims, 6 Drawing Sheets

102 READ IN CONFIGURATION FILES

104 READ IN PLU FILE

106 INITIALIZE DEVICES

110 WAIT FOR DATA FROM TERMINAL AND READ IN DATA

112 IF DATA IS FUNCTION:
 —EXECUTE FUNCTION
 —SEND CONFIRM TO TERMINAL
 —RETURN TO 110

114 IF DATA IS MENU ITEM:
 —ASSIGN CYCLONIC CUSTOMER NUMBER
 —LOOK UP PLU RECORD IN PLU FILE
 —USE DATA TO BUILD ORDER RECORD IN MEMORY
 —SEND DESCRIPTION OF ITEM TO TERMINAL DISPLAY
 —RETURN TO 110

FIG. 5A

120 END OF ORDER FUNCTION (TO GO OR HOUSE ORDER)
 IF ORDER TAKEN ON FIXED TERMINAL:

—DISPLAY ORDER ON COOK'S DISPLAYS
 —RECORD ORDER IN TRANSACTION FILE
 —PRINT ORDER ON COOK'S PRINTER
 —CALCULATE TOTAL PRICE
 —DISPLAY TOTAL PRICE AND CUSTOMER NUMBER ON
   TERMINAL DISPLAY
 —PRINT CUSTOMER RECEIPT AT TERMINAL PRINTER
 —RECEIVE AMOUNT TENDERED ENTERED ON KEYS 43
   AND OPEN CASH DRAWER
 —CALCULATE CHANGE
 —DISPLAY CHANGE ON TERMINAL
 —RETURN TO 110

IF ORDER IS TAKEN ON PORTABLE TERMINAL:

—CREATE TRANSACTION RECORDS
 —DISPLAY ORDER ON COOK'S DISPLAYS
 —RECORD ORDER IN TRANSACTION FILE
 —PRINT ORDER ON COOK'S TERMINAL
 —CALCULATE TOTAL PRICE
 —DISPLAY TOTAL PRICE AND CUSTOMER NUMBER ON
   TERMINAL DISPLAY
 —"PRINT" ORDER RECORD TO QUEUE IN MEMORY BUFFERS
   HOLDING ORDERS TAKEN FROM PORTABLE TERMINALS
 —RETURN TO 110

FIG. 5B

130 NEXT ORDER FUNCTION  FIG. 5C
 —RETRIEVE "OLDEST" ORDER FROM QUEUE IN BUFFER
 —PRINT CUSTOMER RECEIPT AT TERMINAL PRINTER
 —DISPLAY CUSTOMER NUMBER AND TOTAL PRICE ON
  TERMINAL DISPLAY
 —RECEIVE AMOUNT TENDERED ENTERED ON KEY 43
  AND OPEN CASH DRAWER
 —CALCULATE CHANGE
 —DISPLAY CHANGE ON TERMINAL DISPLAY
 —RETURN TO 110

PLU FILE STRUCTURE  FIG. 6

| FIELD | DESCRIPTION |
|---|---|
| PLU NO. | STORE ASSIGNED CODE NO. FOR THE ITEM |
| MENU NO. | DECODED BAR CODE NO. FOR THE ITEM |
| DESCRIPTION | DESCRIPTION OF ITEM |
| PRICE | PRICE OF ITEM IN CENTS |
| TYPE | FO—FOOD LQ—LIQUOR CA—COUPON ETC. |
| CATEGORY | STORE ASSIGNED, USED FOR BREAKING UP RECEIPTS INTO SUB—TOTALS AND DIRECTING ORDERS TO SPECIFIC INSTRUMENTS AND DISPLAYS (E.G. THIS CAN BE USED TO SEND DIFFERENT ITEMS OF AN ORDER TO DIFFERENT KITCHEN DISPLAYS) |

TRANSACTION FILE STRUCTURE  FIG. 7

| FIELD | DESCRIPTION |
|---|---|
| TIME | TIME TRANSACTION CAME IN |
| TRANSACTION NO. | ORDER NO. FOR THE DAY (1ST ORDER IS 1) |
| CUSTOMER NO. | CYCLONIC CUSTOMER NO. (CYCLES FROM 1 TO 99) |
| CANCEL | + INDICATES A NORMAL ORDER, − INDICATES ORDER WAS REMOVED |
| TYPE | SAME AS PLU FILE TYPE, ALSO NEW ONES SUCH AS TO − TOTAL ORDER PRICE |
| MENU NO. | SAME AS PLU FILE MENU NO. |
| PRICE | PRICE FOR ITEM IN DOLLARS CENTS |
| PLU NO. | SAME AS PLU'S FILE PLU NO. |
| TYPE #2 | INDICATES WHETHER NO, WITH, SIDE OR EXTRA TYPE ORDER: N=NO, W=WITH, S=SIDE, E=EXTRA |

APPARATUS FOR ORDER ENTRY IN A RESTAURANT

This is a continuation of application Ser. No. 279,793, filed Dec. 5, 1988, now abandoned.

TECHNICAL FIELD OF THE INVENTION

This invention pertains generally to the field of restaurant equipment and, more particularly, to electronic data processing equipment for customer order entry and processing.

BACKGROUND OF THE INVENTION

Electronic systems for use in restaurants to speed the relay of food orders from customers to the kitchen have long been of interest for their potential to improve service and increase productivity. To this end, various systems have been proposed. For example, U.S. Pat. No. 4,530,067 to Dorr discloses a remote order entry system wherein waiters enter orders into handheld remote order entry units. The orders are transmitted from the units by RF signal to a host computer which displays them on a CRT in the kitchen. The need to carry orders back to the kitchen is thus eliminated and, moreover, orders get to the kitchen virtually simultaneously while being taken from a customer. A similar system is disclosed in U.S. Pat. No. 4,569,421 to Sandstedt in which orders are relayed from the handheld portable units to kitchen CRT displays using cabled telecommunications links.

The portable remote order entry units provided by Sandstedt and Dorr each include a numeric keypad and an alphanumeric display and require that orders be entered as numeric codes. These codes are interpreted by the host computer and converted to human language descriptions of the ordered menu items for display to the cooks. While this approach to order entry is technically feasible, it is undesirable as a practical matter because: (1) it mandates numerical coding of the menu, and (2) it requires waiters to think and work in terms of numbers and codes, adding an additional level of complexity to their work. Moreover, entering orders manually on a keyboard using numeric codes is relatively slow, cumbersome and complicated. Also, the computer terminal-like nature of the portable units of Dorr and Sandstedt make them intimidating and difficult to learn for waiters and other restaurant personnel who are often poorly educated and technically illiterate, particularly in so-called "fast food" restaurants. Accordingly, systems such as those shown in Dorr and Sandstedt have limited commercial desirability.

Because of the clear advantages that can be obtained with remote order entry systems there remains a considerable interest in trying to develop commercially practical systems. To this end, the industry has looked for a remote order entry unit which is fast, easy to learn and operate, readily adaptable and relatively inexpensive. As set forth below, the present invention provides a portable remote order entry unit which meets these objectives. Moreover, the order entry concept of the present invention are also advantageous for use in fixed order entry terminals.

SUMMARY OF THE INVENTION

The present invention provides a portable order entry terminal for use in a remote order entry system in a restaurant. According to one aspect of the invention, there is provided a handheld terminal including a bar code scanner. The handheld terminal includes a bar code template which includes an array of restaurant selections specified by human language descriptions, with each description having a corresponding bar code adjacent thereto. The template thus resembles a conventional restaurant order pad. The bar code scanner preferably consists of a light pen which is used to enter orders by scanning the bar code adjacent the description of an item ordered by the customer. Accordingly, the portable order entry terminal according to the present invention is thus used in a manner very similar to a conventional restaurant order pad making it simple to learn and operate.

According to another aspect of the invention, the order entry system includes host computer means for interpreting numeric identifier data scanned from the template of said terminal and for causing a human language description of the scanned menu item to be displayed on the terminal whereby the order can be verified. According to another aspect, the systems includes means for communicating orders to the cooks in the kitchen of the restaurant whereby the order can be prepared.

BRIEF DESCRIPTION OF THE DRAWINGS

FIGS. 5A, 5B and 5C are a flow chart block diagram of the software of the host computer according to the present invention;

FIG. 6 is a block diagram showing the file structure for the PLU File according to the present invention; and FIG. 7 is a block diagram showing the file structure of the Transaction File according to the present invention.

DETAILED DESCRIPTION OF THE INVENTION

Figure 1:
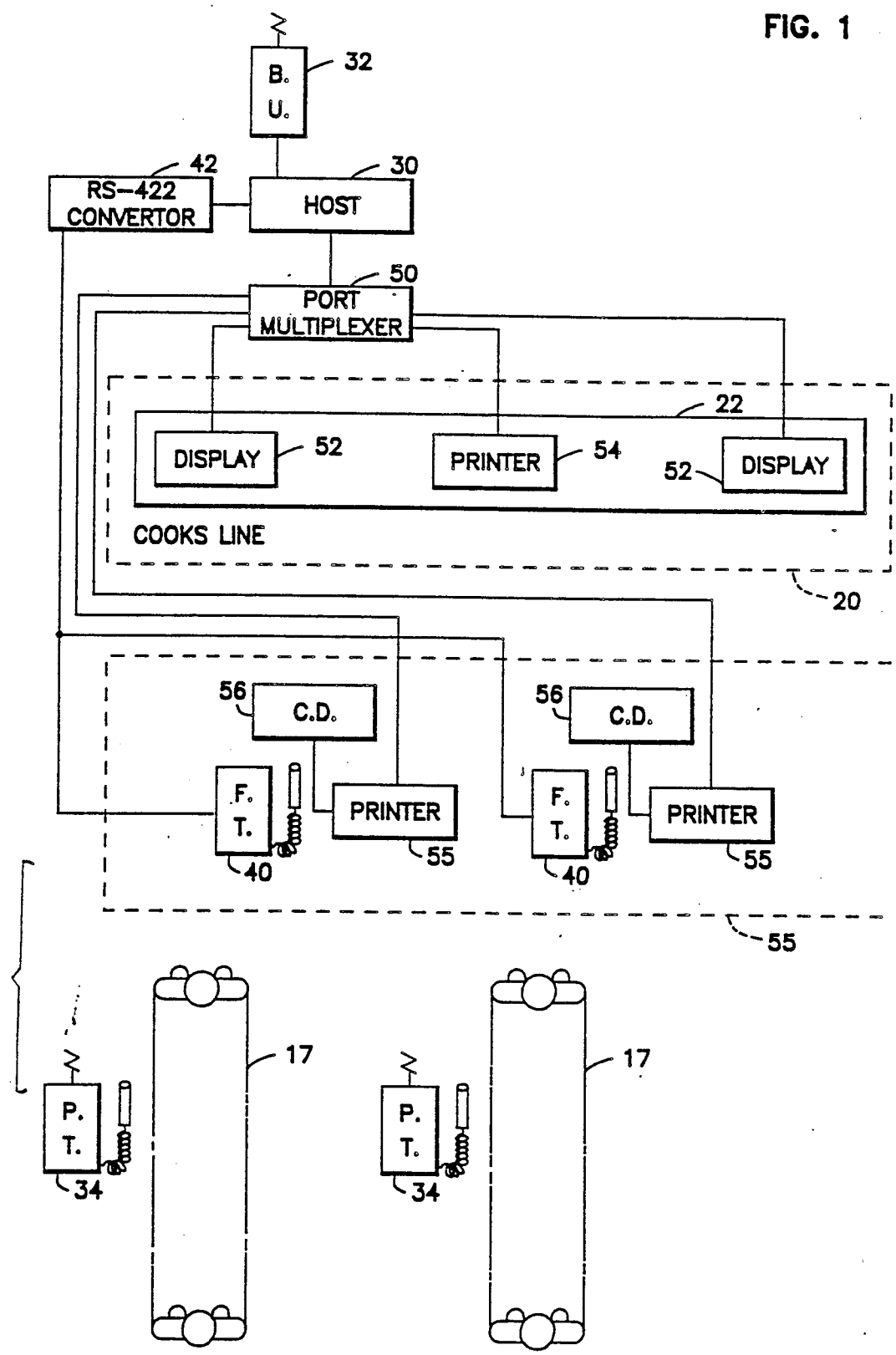
FIG. 1 is a schematic overview drawing of a remote order entry system implemented in a fast-food restaurant according to the present invention.

Referring now to FIG. 1, there is shown an overview of an order entry system 10 including a portable order entry terminal according to the present invention. As shown in FIG. 1, the system is implemented in a fast-food restaurant including an order counter 15 and a kitchen 20 including a cooks' line 22. Shown diagrammatically are lines 17 of customers waiting to place orders at counter 15. The order entry system 10 includes a host computer 30, a base station and communication multiplexer 32, one or more handheld portable order entry terminals 34, one or more fixed terminals 40, an RS 422 converter 42, host computer ports 50, displays 52 and printers 54 and 55. Displays 52 and printer 54 are located on the cooks' line 22 and are accessible to cooks working in kitchen 20. Printers 55 are located adjacent the fixed terminals 40 on counter 15. Also located on counter 15 are one or more cash drawers 56, one each associated with a fixed terminal and printer pair. Portable terminals 34 are held by order taking personnel standing next to customers in lines 17. Displays 52 and printers 54 and 55 are connected to computer 30 through ports 50, while fixed terminals 40 are connected to host computer 30 through RS 422 Converter 42. Cash drawers 56 are connected to printers 55 and are controlled by the host 30 via the printer. Portable terminals 34 communicate with host computer 30 through base station and communication multiplexer 32 using UHF RF signals.

Figure 2:
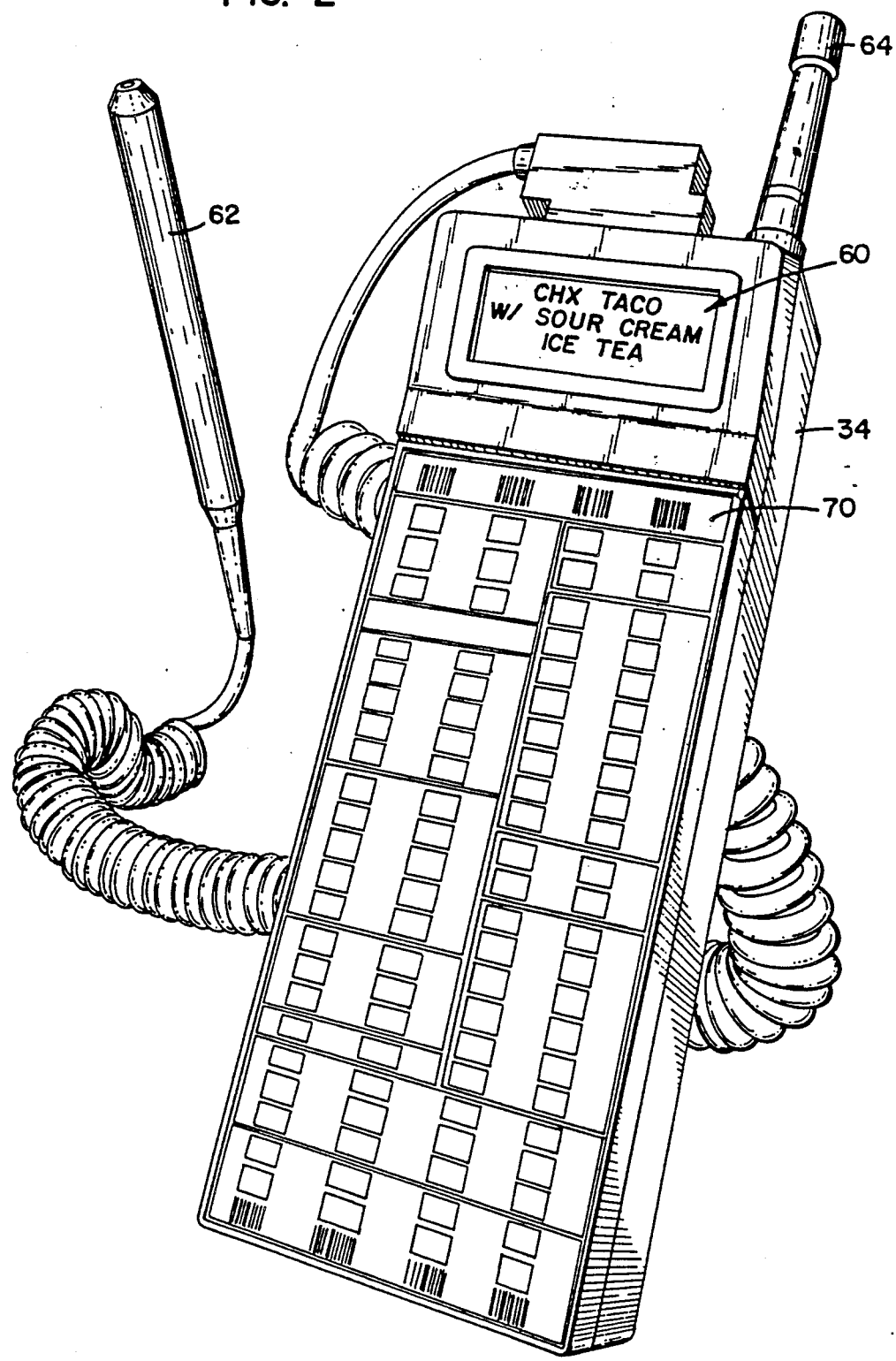
FIG. 2 is a perspective view of the remote order entry terminal according to the present invention.
Figure 3:
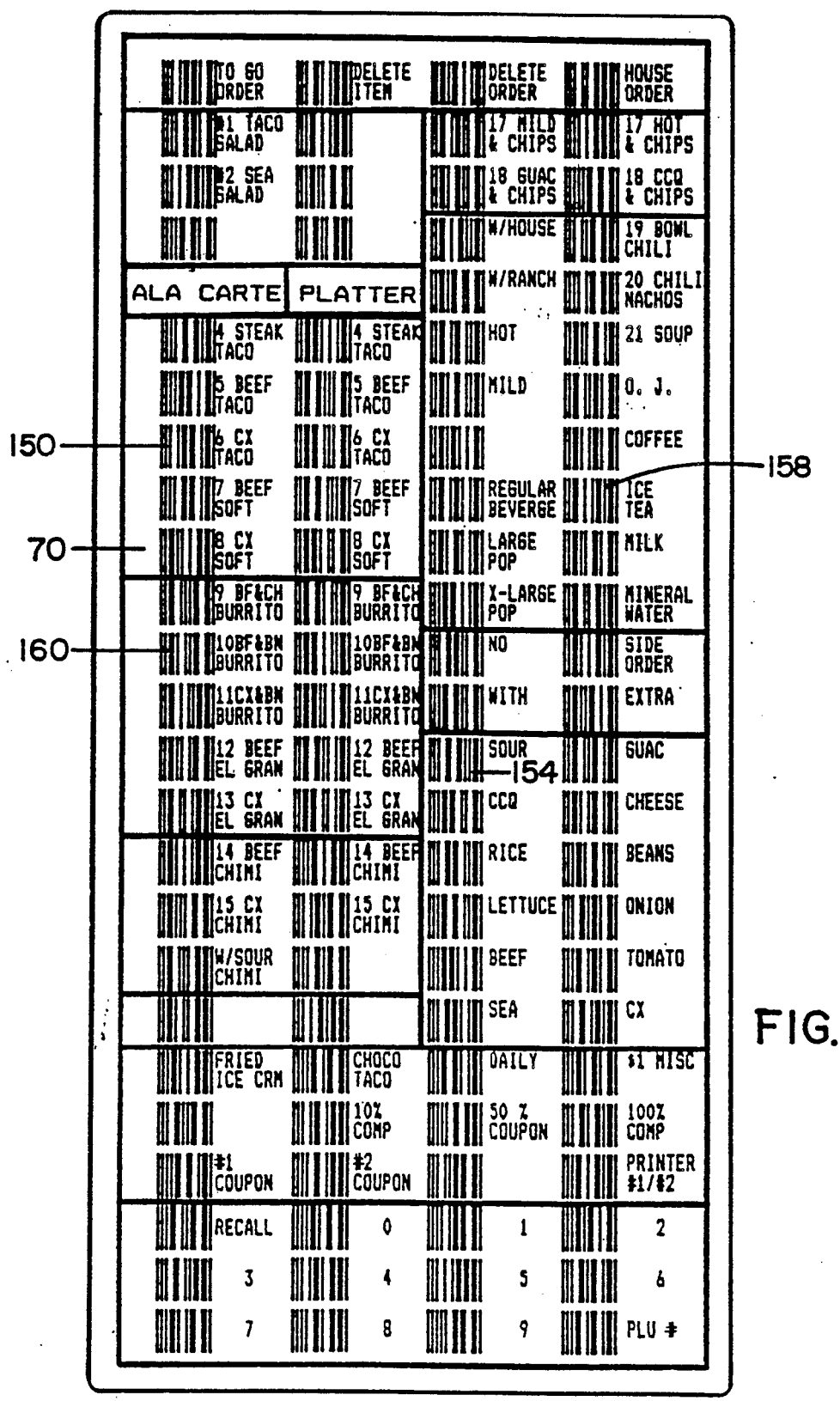
FIG. 3 illustrates a terminal template used on the entry terminals of the present invention.
Figure 4:
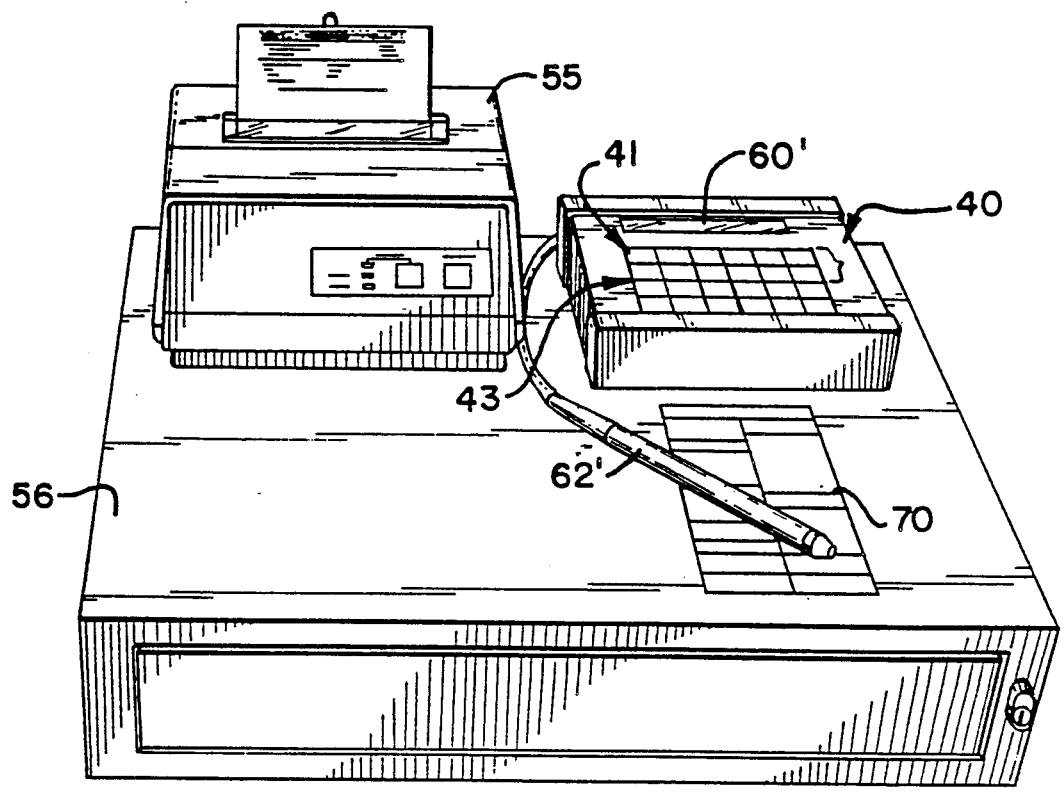
FIG. 4 shows a perspective view of the fixed terminal and cash drawer according to the present invention.

Referring now to FIGS. 2, 3, and 4 there is shown one of the portable entry terminals 34 according to the present invention. As shown in FIG. 2, portable entry 34 includes a 4 line by 16 character LCD display 60, a light pen bar code reader 62 and an antennae 64 for UHF communications with base unit 32. The keypad area of portable terminal 34 is covered with a template 70 which includes bar coded menu items and terminal functions. Portable terminals 34 are preferably small and light enough to be held in one's hand and designed to communicate to the host in the same manner as a conventional dumb terminal provided, however, communication between terminal 32 and host computer 30 is accomplished through an RF link.

As shown in FIG. 4, fixed terminals 40 are of generally the same configuration as portable terminals 34, having a display 60' (two lines in this case), a template 70 and bar code reading light pen 62' except that fixed terminals 40 communicate with host computer 30 through a cabled connection (and thus do not require radio frequency transmission capability) and include numeric and function keys 41 that are push activated. Keys 41 consist of numeric keys 43 (for entering dollar amounts) and a NEXT ORDER function key, an AMOUNT TENDERED function key any a CLEAR ERROR function key. Preferably, terminal 40 is fastened on top of the cash drawer 62 with the template 70.

Portable terminals 34 are preferably the Model RT 2210 handheld terminals available from the Norand Corporation of Cedar Rapids, IA, configured with the light pen bar code reader option. Preferably, template 70 is printed on a paper product and plastic encapsulated to provide a water and wear resistant sheet-like template structure. In the case of the portable terminals 34, the template 70 is affixed to the front of the RT 2210 terminal in place of or over its keyboard. The base station and communications multiplexer 32 is preferably a Norand base station unit Model RB 2212 combined within the Norand communications multiplexer Model RM 2216. Fixed terminals 40 are preferably constructed using the TransTerm terminal model TT5A configured with a light pen bar code reader available from Computerwise, Olis, KS. In the case of terminal 40, template 70 is mounted on a surface adjacent the TransTerm terminal, as noted above. Host computer 30 is preferably an IBM compatible PC. Displays 52 are preferably standard black and white composite monitors, while printers 54 and 55 are preferably Model PD8340 dot matrix printers available from Star Micronics of Nakayoshida, Shizvoka, Japan.

The general configuration of the system 10 having been described, its operation will be briefly explained before going further into its details. Generally, the system operates as follows. Orders are entered via handheld terminals 34 and fixed terminals 40. Orders are taken from customers standing at the front of line 17 at one of fixed terminals 40 as is conventionally the case. Orders may also be taken using terminals 34 from customers standing in line 17 who are waiting to reach counter 15, for instance as might be desirable during a "rush" period to improve customer "throughput".

Once an order is entered at one of terminals 40, host computer 30 causes the price for the order to be displayed at the terminal 40. The amount tendered by the customer is keyed into the numeric keys 43, displayed on the terminal display for verification and then entered into the system by pushing the AMOUNT TENDERED key. The change due to the customer is then displayed at the terminal and the customer is given his change from the cash drawer 56 which is opened by a signal from the printer. At the same time the price of the order is displayed, the system initiates the printing of a customer receipt on one of printers 55 at the counter and causes the order to be printed on the printer 54 on the cooks' line 22. The order is also simultaneously displayed on one or both of displays 52 which the cooks reference to prepare the order. The receipt and the order printed on printer 54 each have the same customer number printed on them. Once the order is prepared, it is placed with its corresponding printed order taken from printer 54. Personnel working counter 15 then retrieve the order and match it up with the customer holding the corresponding receipt.

In the case where orders are taken from handheld terminals 34, the customer is verbally informed of his or her customer number and the price of the order while standing in line (the customer number and price is transmitted from the host computer to terminal 34) and the order is printed at the kitchen printer 54 and displayed on the kitchen CRTs 52. When the customer reaches the counter 15 the person working the cash register pushes the NEXT ORDER key and the host computer 30, which maintains a queue of remotely entered orders, shows the food ordered, the customer number and price of the order. At the same time, the host causes the customer's receipt to begin printing on the counter printer 55. The amount tendered is entered, the change indicated, the receipt printed and change returned, in the same manner as set out above for orders entered at terminal 40. The customer then picks up his or her food if it is ready or waits until the order comes up.

Referring now to FIG. 5, there is shown a simplified flow diagram of the system control and order processing software 100 operable in host computer 30 of system 10. Software 100 includes a first segment 102 for reading in the configuration files for the system. These files include, for instance, information on the number of peripherals connected to the system and their control parameters. Software 100 also includes a routine 104 to read in the PLU File. The PLU File includes a record for each item on the restaurant's menu.

As shown in FIG. 6, each record of the PLU File includes a PLU # field, a Menu Number field, a Description field, a Price field, a Type field and a Category field. The PLU # field contains a store assigned code number for the menu item. The Menu Number field contains a decoded bar code number for the item (each item on the menu is assigned a unique bar code number). The Description field contains a text description of the item. The Price field contains the price of the item in cents. The Type field contains information on the type of item represented by the record. For example, the item might be a food item, liquor item coupon item or the like. The Category field contains a store assigned category which can be used for breaking up receipts in subtotals or to determine which kitchen display an ordered item should be sent to (not used for tis purpose in the system disclosed herein).

Continuing on, software 100 includes a routine 106, whereby the peripheral equipment connected to host computer 30 is initialized for operation as is conventionally done. Software 100 further includes a routine 110 for monitoring the input ports of computer 30 for data from either a remote terminal 34 or a fixed terminal 40, and reading it in when it arrives. This data comprises menu and terminal function entries scanned from a template 70 using the light pen bar code reader 62 or generated from the keys 41 in the case of terminal 40. If the data read in is a function, routine 112 executes it, returns a confirm to the terminal display, and returns to await more data at routine 110. More information on how functions are executed by routine 112 will be described below.

If the data is a menu item selection, routine 114 uses it to build an Order record in memory. This operation is repeated for each separate menu item scanned from the template 70 until the order is completely entered and the Order record complete. Each time routine 114 receives another food item to add to the Order Record, the description of the item is sent to the terminal from which it arrives to be displayed so that the order can be verified. Routine 114 then branches to input routine 110. Once order entry is completed, the end of the order is signalled by the order taking personnel by scanning either the TO GO ORDER function or the HOUSE ORDER function. Routine 112 is responsive to either of these functions to jump to routine 120.

As shown in FIG. 5B, routine 120 carries out several operations as follows. For one, it takes the Order record from memory and creates one or more Transaction records with it and adds these records to the Transaction File stored on disk. Generally, one record is created for each food item in the Order record held in memory, and each is given the same cyclonic customer number (assigned by routine 114). While certain items scanned from the template merely constitute special changes to a previously specified food item (and are not charged for) they still get recorded in a Transaction record. For instance, if a taco is ordered with no cheese, one Transaction record is created for the taco and one to indicate that no cheese was put on the taco. This allows the Transaction File to contain an accurate record of store inventory.

Referring to FIG. 7, the structure of each Transaction File record will be explained. Each record in the Transaction File includes a Time field, a Transaction Number field, a Customer Number field, a Cancel field, a Type field, a Menu Number field, a Price field, a PLU # field and a Type #2 field. The Time field holds the time that the transaction occurred during the day. The Transaction No. field holds an order number which is sequentially assigned beginning with the first food item order each day. The Customer No. field contains a cyclic customer number which cycles from 1 to 99. The Cancel field contains a logical operator which indicates whether the transaction record is "normal" or cancelled. The Type, Menu Number, Price and PLU # fields contain the same information in the corresponding field of the PLU records as described above. The Type #2 field is used to indicate whether the item was ordered to be left out of an order (e.g. taco no cheese) to be added (e.g. taco with chicken); was extra (e.g. taco with extra cheese) or was a side order. This field is only referenced if the food item specified in the record has the potential to fit one of these categories.

Accordingly, for each Transaction record created routine 120 puts the time that the transaction came in the Time field (obtained from the system clock). Also, routine 120 assigns an order number and loads it into the Transaction Number field. The cyclic Customer Number is stored in the customer number field. This customer number is printed on the customer's receipt and on the order printed in the kitchen on printer 54. When an Transaction record is created, the Cancel field is loaded with a logical operator which indicates the order is active, (i.e. normal). If the order is cancelled, this logical operator is switched in all corresponding records to reflect the cancellation. The Type, Menu Number, Price and PLU # fields contain the same information as the corresponding fields of the PLU File records, and the data for these fields is pulled from the corresponding PLU record for the ordered item. As indicated above, the Type 2 field is set accordingly if the recorded item so requires.

Routine 120 is also operative to calculate a total price for the order by adding the prices of ordered items. These prices are obtained from the Order record in memory. Routine 120 causes this total, along with the assigned customer number for the order, to be immediately displayed on the terminal from which the order originated, whether a remote or fixed terminal. Also, routine 120 provides that the order is printed on the cooks' printer with the customer's number and displayed on the cooks' CRT displays. If the order is entered at a fixed terminal 40 routine 120 immediately begins printing a customer receipt on one of counter printers 55 while the customer tenders his payment. The amount tendered is then entered into the keys 43 of terminal 40 and entered using the AMOUNT TENDERED key. Routine 120 receives this dollar amount, calculates the change to be returned and causes it to be displayed at the terminal. The customer's change is then returned from the cash drawer (the drawer opens when the customer AMOUNT TENDERED key is pressed) along with their customer receipt showing the customer's food order and customer number so that the customer's order can be located when it is delivered from the kitchen. If the order is entered from a remote terminal, the Order record and total price is temporarily "written" to a memory queue until the customer reaches the counter 15. The software thereafter returns to routine 110 to await more input.

When a customer who has entered an order at a portable terminal reaches the counter, the receipt printing and paying process is initiated by the counter personnel by pressing the NEXT ORDER key on terminal 40. As shown in FIG. 5C, routine 130 is thereby activated via routine 112 to take the "oldest" Order record from the queue for that terminal (the position of the orders in the queue correspond to the order of customers in the line) and uses it to display the customer's order, including price, and to print the customer's receipt on printer 55. The customer pays and receives his receipt as described above with respect to orders entered at a terminal 40. Software 100 then returns to routine 110 to wait for a further order.

Although not shown explicitly herein, software 100 includes the capability to "multiplex" order input data between the various terminals. Thus, the order entry and payment process described above can be executed for a plurality of terminals "simultaneously" by time division multiplexing or like techniques. Thus, software 100 can service a plurality of customers at once.

Template 70 of portable terminals 34 is shown at actual scale in FIG. 3 (the dimensions of handheld portable entry terminal 34, as shown in FIG. 2, can thus be determined with reference to FIG. 3). The items on template 70 consist either of menu items or terminal functions. For example, the first row of template 70 comprises the functions: TO GO ORDER; DELETE ITEM; DELETE ORDER and HOUSE ORDER. The NO, WITH, SIDE ORDER and EXTRA items found in rows 12 and 13 also comprise functions. Further terminal functions are found in rows 20–22, and relate to daily specials, complimentary meals and printer function. The final three rows of template 70 include a RECALL function, a 0–9 numeric bar coded "keypad" and a PLU # function. As shown, each item and function on the template 70 consists of an english language description of the item or function paired with a corresponding bar code which is the numeric identifier for the item or function. The bar code on template 70 is preferably in black ink while the descriptions are in red ink so that the text of the descriptions does interfere with scanning of the bar codes.

Each of terminals 34 and 40 awaits in its idle mode for the entry of a customer order. To enter an order, restaurant personnel need only use the light pen to scan the associated bar codes for the selected menu items. For example, the order "chicken taco with sour cream and ice tea" would be entered by passing the light pen over bar code items 150, 152, 154 and 158 in sequence (see FIG. 3). The terminal would respond after each scan so that when finished the display would read:
CHX TACO
WITH SOUR CREAM
ICE TEA
This sequence thus identifies three food items: chicken taco, sour cream and ice tea that the taco should be served with sour cream. The function WITH is executed by routine 112 by sending the "WITH" confirm to the terminal and tagging the sour cream item as a "with" item in the Order record in memory. Routine 120 uses this "with tag" to create the proper order to be displayed to the cooks and to be printed on the cook's printer and on the customer's receipt. Furthermore, routine 120 uses the tag to determine if the sour cream item is to be charged for. For instance, a NO item would have no charge, while EXTRA or SIDE time would carry a charge, as would be indicated in the price field of the item's PLU record. The order can be completed, for example, by scanning the TO GO ORDER function in the first row of the template. Alternatively, the order can be specified as a HOUSE ORDER, whereupon, in that case, the HOUSE ORDER function is scanned to end the order.

As may be readily seen, the NO and EXTRA functions operate in a manner similar to the WITH function as described above. For example, a beef taco might be ordered "with no cheese" or "with extra lettuce". The SIDE ORDER function can be used to specify that the next food item to be scanned is a side order. Ordered items or entire orders may be deleted by using the DELETE ITEM and DELETE ORDER functions in the first row of the template. The DELETE ITEM function, when scanned, causes software 100 to go into the last item entered in the Order record in memory (for the terminal) and delete the item. The DELETE ORDER function operates similarly but causes all items ordered for the current customer to be deleted from the Order record.

As noted above, various extra system functions are provided on template 70 to accommodate, for instance, coupon discounts, complimentary meal discounts, and general terminal functions. For instance, if a customer has a 50% coupon for a beef and bean burrito, the order entry personnel would scan bar code 160 and bar code 162 in sequence. A RECALL function is provided at the bottom of template 70 and may be used to recall previously ordered items for review. These items would be recalled for the Order record. Moreover, a bar code with numeric "keypad" is provided at the bottom of template 70 wherein numbers may be entered into the terminal. Using numeric entries an order entry personnel may, for instance, directly specify the PLU# of a menu item by scanning the desired numbers on the keypad followed by the PLU # function. This signals the software 100 in host computer to create an entry in an order using data from the corresponding PLU record.

Thus, it may be readily seen that orders may be entered quickly in a manner very similar to that used to manually take orders on a conventional handheld restaurant order pad. Because the manner of entering orders is very analogous to the conventional approach, it has been found that order taking personnel are easily trained to use the order entry terminals 34 and 40. Moreover, the system is readily adaptable because the terminal templates are cheap to make and easily customized allowing for the use of different templates during the day as may be desirable to accommodate different breakfast, lunch and dinner menus. The templates are also readily adaptable to fit the needs of the particular restaurant the system 10 is installed in.

Another advantage of the system of the present invention is that it allows quite a few menu items and functions to be comfortably fit on the front of the portable terminals 34. The advantage of this is even more apparent when comparing the template 70 to the standard keyboard of a normal RT 2210 terminal which has only about 40 keys. On the other hand, the template 70 shown in FIG. 3 has 98 bar code items (and room for at least two more). Moreover, it is believed that up to one hundred fifty items could be comfortably fit on the terminal template 70 on a single page, with the option of having multiple pages. To get this many keys in a Norand unit would increase its cost significantly. Moreover, it would be difficult to squeeze so many keys into the limited space available while allowing enough space between them to assure error free operation at the desired rates.

Although the invention has been described herein in its preferred form, those skilled in the art will recognize that various modifications may be made thereto without departing from the spirit and scope of the claims appended hereto.

What is claimed:

1. An order entry system for use in a restaurant, comprising:
   host means;
   at least one portable terminal sized to be held in a single human hand, including:
   (a) a display;
   (b) wireless communication means for sending data communications to said host means;
   (c) template means covering a surface of said portable terminal and including an array of human language descriptions of restaurant menu selections with each of said descriptions having a corresponding bar code adjacent thereto, said bar code providing an alphanumeric identifier for the seleciton;

(d) a bar code scanner light pen means for scanning bar code and generating menu selection data corresponding to said bar code, said light pen means sized to be held like a pen in a human hand so that menu selections ordered by a restaurant customer can be scanned as bar code entries using said light pen means;

(e) means for causing said communication means to send said host means customer order data corresponding to said menu selection data generated by said light pen means;

one or more fixed terminals each including:

(a) a display;

(b) communication means for sending data communications to said host means;

(c) template means covering a surface of said fixed terminal and including an array of human language descriptions of restaurant menu selections with each of said descriptions having a corresponding bar code adjacent thereto, said bar code providing an alphanumeric identifier for the selection;

(d) a bar code scanner light pen means for scanning bar code and generating menu selection data corresponding to said bar code, said light-pen means sized to be held like a pen in a human hand so that menu selections ordered by a restaurant customer can be scanned as bar code entries using said light pen means;

(e) means for causing said communication means to send said host means customer order data corresponding to said menu selection data generated by said light pen means;

said host means including:

(a) communication means for receiving data communication from said terminals;

(b) display means for conveying information to the cooks in said restaurant;

(c) display control means for receiving customer order data sent from a said portable terminal and a said fixed terminal and for causing said display means to convey human language descriptions of customer orders specified by said customer order data so that an order can be communicated immediately from said terminals to said cooks.

2. A system according to claim 1 further including means for causing human language descriptions of menu selections specified by said menu selection data to be displayed on the display of a said terminal at which said menu selections are entered.

3. A system according to claim 2 further including means for interpreting a sequence of menu selection data entered at a said terminal and grouping said sequence into a customer order data set so that a complete customer order can be entered as a sequence of menu selections scanned from said template in a manner analogous to checking items on a conventional order pad.

4. A system according to claim 1 further including means for interpreting a sequence of menu selection data entered at a said terminal and grouping said sequence into a customer order data set so that a complete customer order can be entered as a sequence of menu selections scanned from said template in a manner analogous to checking items on a conventional order pad.

5. A system according to claim 1 further including means for grouping related menu selection data entered at a said terminal into a customer order data set and assigning a customer number to said set and causing said number to be displayed on the display means of the said terminal at which said group is entered.

6. A system according to claim 5 further wherein said fixed terminals each include means for entering a next order request and a cash drawer, and wherein said system further includes:

means for forming an order queue of said data sets and corresponding customer numbers for customer orders entered at said portable terminals;

means for calculating the amount owed by a customer for a customer order specified in a customer order data set; and means responsive to a next order request entered at a fixed terminal for causing the display of said fixed terminal to display the customer order number for the next available customer order data set in said queue and the corresponding amount owed by the customer for the order whereby the amount tendered by the customer can be placed in the cash drawer and change can be made from the cash drawer.

7. An order entry system according to claim 1 further wherein said template means covering the surface of a said portable terminal includes one or more human language descriptions of system functions with each said descriptions having a corresponding bar code adjacent thereto, whereby system functions can be scanned as bar code entries using said light pen means.

8. An order entry system according to claim 1 further wherein said template means covering the surface of a said fixed terminal includes one or more human language descriptions of system functions with each said descriptions having a corresponding bar code adjacent thereto, whereby system functions can be scanned as bar code entries using said light pen means.

9. An order entry system for use in a restaurant, comprising:

host means;

at least one portable terminal sized to be held in a single human hand, including:

(a) a display;

(b) wireless communication means for sending data communications to said host means;

(c) template means covering a surface of said portable terminal and including an array of human language descriptions of restaurant menu selections and order entry functions with each of said descriptions having a corresponding bar code adjacent thereto, said bar code providing an alphanumeric identifier for the selection or function;

(d) a bar code scanner light pen means for scanning bar code and generating menu selection data corresponding to said bar code, said light pen means sized to be held like a pen in a human hand so that menu selections ordered by a restaurant customer and order entry functions can be scanned as bar code entries using said light pen means and so that a customer order can be entered using only said light pen means without using push-button switches;

(e) means for causing said communication means to send said host means customer order data corresponding to said menu selection and order entry function data generated by said light pen means;

one or more fixed terminals each including:
(a) a display;
(b) communication means for sending data communications to said host means;
(c) template means covering a surface of said fixed terminal and including an array of human language descriptions of restaurant menu selections and order entry functions with each of said descriptions having a corresponding bar code adjacent thereto, said bar code providing an alphanumeric identifier for the selection or function;
(d) a bar code scanner light pen means for scanning bar code and generating menu selection data corresponding to said bar code, said light-pen means sized to be held like a pen in a human hand so that menu selections ordered by a restaurant customer and order entry function can be scanned as bar code entries using said light pen means and so that a customer order can be entered using only said light pen means without using push-button switches;
(e) means for causing said communication means to send said host means customer order data corresponding to said menu selection and order entry function data generated by said light pen means;

said host means including:
(a) communication means for receiving data communication from said terminals;
(b) display means for conveying information to the cooks in said restaurant;
(c) display control means for receiving customer order data sent from a said portable terminal and a said fixed terminal and for causing said display means to convey human language descriptions of customer orders specified by said customer order data so that an order can be communicated immediately from said terminals to said cooks.

10. A system according to claim 9 further including means for causing human language descriptions of menu selections specified by said menu selection data to be displayed on the display of a said terminal at which said menu selections are entered.

11. A system according to claim 9 further including means for interpreting a sequence of menu selection and order entry function data at a said terminal and grouping said sequence into a customer order data set so that a complete customer order can be entered as a sequence of menu selections scanned from said template in a manner analogous to checking items on a conventional order pad.

12. A system according to claim 10 further including means for interpreting a sequence of menu selection and order entry function data entered at a said terminal and grouping said sequence into a customer order data set so that a complete customer order can be entered as a sequence of menu selections scanned from said template in a manner analogous to checking items on a conventional order pad.

13. A system according to claim 9 further wherein said fixed terminals each include means for entering a next order request and a cash drawer, and wherein said system further includes:
means for forming an order queue of said data sets and corresponding customer numbers for customer orders entered at said portable terminals;
means for calculating the amount owed by a customer for a customer order specified in a customer order data set; and
means responsive to a next order request entered at a fixed terminal for causing the display of said fixed terminal to display the customer order number for the next available customer order data set in said queue and the corresponding amount owed by the customer for the order whereby the amount tendered by the customer can be placed in the cash drawer and change can be made from the cash drawer.

* * * * *

UNITED STATES PATENT AND TRADEMARK OFFICE
CERTIFICATE OF CORRECTION

PATENT NO. : 5,003,472

DATED : March 26, 1991

INVENTOR(S) : John C. Perrill, et al.

It is certified that error appears in the above-identified patent and that said Letters Patent is hereby corrected as shown below:

Col. 2, line 21 delete "systems" and insert therefor --system--.

Col. 3, line 32, delete "any" and insert therefor --and--.

Col. 4, line 67, delete "tis" and insert therefor --this--.

Col. 6, line 9, delete "an" and insert therefor --a--.

Col. 7, line 21, after the word --does- insert therefor --not--.

Signed and Sealed this

Twenty-fifth Day of August, 1992

Attest:

DOUGLAS B. COMER

Attesting Officer      Acting Commissioner of Patents and Trademarks